(12) United States Patent
Liu et al.

(10) Patent No.: US 12,367,143 B2
(45) Date of Patent: Jul. 22, 2025

(54) DATA CACHING METHOD AND APPARATUS, DEVICE, AND STORAGE MEDIUM

(71) Applicant: Suzhou MetaBrain Intelligent Technology Co., Ltd., Jiangsu (CN)

(72) Inventors: Wenzhi Liu, Jiangsu (CN); Yonggang Wang, Jiangsu (CN); Jian Wang, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/875,283

(22) PCT Filed: Jun. 28, 2023

(86) PCT No.: PCT/CN2023/103138
§ 371 (c)(1),
(2) Date: Dec. 16, 2024

(87) PCT Pub. No.: WO2024/119786
PCT Pub. Date: Jun. 13, 2024

(65) Prior Publication Data
US 2025/0165399 A1  May 22, 2025

(30) Foreign Application Priority Data
Dec. 6, 2022 (CN) .................. 202211553153.X

(51) Int. Cl.
*G06F 12/08* (2016.01)
*G06F 12/0802* (2016.01)
(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS 5,944,815 A * 8/1999 Witt .................. G06F 9/383
711/E12.07

FOREIGN PATENT DOCUMENTS

| CN | 107003920 A | 8/2017 |
|---|---|---|
| CN | 107357688 A | 11/2017 |

(Continued)

OTHER PUBLICATIONS

International Search Report cited in PCT/CN2023/103138, mailed Sep. 16, 2023, 7 pages.

(Continued)

*Primary Examiner* — Jae U Yu
(74) *Attorney, Agent, or Firm* — Cooper Legal Group, LLC

(57) ABSTRACT

A data caching method, including: in response to a faulty node returning to normal, adding the faulty node to a recombined mirrored pair according to a mirrored pair where the faulty node is initially located to obtain a transitional mirrored pair whereby in a cached data re-mirroring process, when one node of the mirrored pair is faulty, data mirroring continues between other nodes; initiating, by a main node in the transitional mirrored pair, a cached data re-mirroring operation process to the faulty node; and in response to the main node in the transitional mirrored pair completing the cached data re-mirroring to the faulty node, deleting a redundant node in the transitional mirrored pair based on an initial mirrored pair to switch the transitional mirrored pair back to the initial mirrored pair for data caching.

20 Claims, 3 Drawing Sheets

(56) References Cited

FOREIGN PATENT DOCUMENTS

| | | |
|---|---|---|
| CN | 112269683 A | 1/2021 |
| CN | 113064755 A | 7/2021 |
| CN | 114281591 A | 4/2022 |
| CN | 115237683 A | 10/2022 |
| CN | 115268784 A | 11/2022 |
| CN | 115563028 A | 1/2023 |

OTHER PUBLICATIONS

Written Opinion cited in PCT/CN2023/103138, mailed Sep. 16, 2023, 7 pages.
First Office Action cited in CN202211553153.X, mailed Jan. 10, 2023, 9 pages.
Notification to Grant Patent Right for Invention cited in CN202211553153.X, mailed Feb. 9, 2023, 2 pages.

\* cited by examiner

DATA CACHING METHOD AND APPARATUS, DEVICE, AND STORAGE MEDIUM

This application claims priority to Chinese Patent Application No. 202211553153.X, filed on Dec. 6, 2022 in China National Intellectual Property Administration and entitled "Data Caching Method and Apparatus, Device, and Storage Medium", which is hereby incorporated by reference in its entirety.

FIELD

The present application relates to the technical field of computer data storage, and particularly to a data caching method and apparatus, a device, and a storage medium.

BACKGROUND

A four-control storage system refers to a storage system including four controllers in a machine frame, with each controller acting as a node. Data may be saved and backed up in four nodes in the machine frame according to needs and scenarios, thereby improving performance and data security of the storage system. The four-control storage system mainly adopts a mirrored pair method to cache data. When one of the controllers fails, the system may continue to find a corresponding mirrored node for each node in a circular mirroring manner, ensuring that the storage system may operate normally and maintain data integrity even when nodes fail sequentially.

When a faulty node returns to normal, the node confirms a new mirrored pair teaming method according to the cluster and designates an original surviving node to initiate a cached data re-mirroring process to the node. During the node re-teaming process, one node needs to exit, and data corresponding to the node is abandoned. Thus, in this process, the data is easily confused and lost, and the security of data may not be guaranteed.

SUMMARY

Based on this, the present application provides a data caching method and apparatus, a device, and a storage medium, which may timely restore the normal operation of a node, avoid data loss, and improve the security of cached data.

In a first aspect, a data caching method is provided, and the method is applied to a multi-control storage system, where the multi-control storage system includes multiple controllers, and each controller is a node; the method includes:

in response to a faulty node returning to normal, adding the faulty node to a recombined mirrored pair according to a mirrored pair where the faulty node is initially located to obtain a transitional mirrored pair whereby in a cached data re-mirroring process, when one node of the mirrored pair is faulty, data mirroring continues between other nodes; initiating, by a main node in the transitional mirrored pair, a cached data re-mirroring operation process to the faulty node; and in response to the main node in the transitional mirrored pair completing the cached data re-mirroring to the faulty node, deleting a redundant node in the transitional mirrored pair based on an initial mirrored pair to switch the transitional mirrored pair back to the initial mirrored pair for data caching, where the recombined mirrored pair is a mirrored pair obtained based on two-by-two recombination of surviving nodes after the faulty node exits due to recombining the mirrored pair where the faulty node is initially located;

the initial mirrored pair is a mirrored pair obtained based on two-by-two recombination of all nodes before the faulty node exits.

According to some implementations of the present application, the in response to a faulty node returning to normal, adding the faulty node to a recombined mirrored pair to obtain a transitional mirrored pair includes:

determining a target mirrored pair for recombination when the faulty node exits according to the mirrored pair where the faulty node is initially located; and adding the faulty node to the target mirrored pair in the recombined mirrored pair to obtain the transitional mirrored pair.

According to some implementations of the present application, the adding the faulty node to the target mirrored pair in the recombined mirrored pair to obtain the transitional mirrored pair includes:

adding the faulty node by a main node of the target mirrored pair in the recombined mirrored pair used as a new main node to obtain the transitional mirrored pair.

According to some implementations of the present application, the transitional mirrored pair includes two surviving nodes and one faulty node, and each node in the transitional mirrored pair is provided with two peer nodes;

between the peer nodes of one surviving node, the other surviving node is a preferred peer node, and the faulty node is an alternative peer node;

between the peer nodes of the faulty node, one surviving node acting as the main node is a preferred peer node, and the other surviving node is an alternative peer node.

According to some implementations of the present application, when the transitional mirrored pair switches back to a mirrored pair before the fault of the multi-control storage system, the alternative peer node of each node in the transitional mirrored pair is set to an invalid value.

According to some implementations of the present application, the deleting a redundant node in the transitional mirrored pair based on an initial mirrored pair includes:

determining the redundant node in the transitional mirrored pair according to a corresponding mirrored pair of the transitional mirrored pair in the initial mirrored pair; and deleting the redundant node in the transitional mirrored pair.

According to some implementations of the present application, the method further includes:

after deleting the redundant node in the transitional mirrored pair, performing a cached data discarding process on the redundant node to delete corresponding cached data of the redundant node in the transitional mirrored pair.

According to some implementations of the present application, the method further includes:

when there is a burst faulty node during the main node in the transitional mirrored pair performing the cached data re-mirroring operation process to the faulty node, determining a current main node according to identity information of the burst faulty node; and determining a first operation process to be performed subsequently based on the current main node.

According to some implementations of the present application, the identity information includes a main node identity, and the first operation process includes a cached data discarding process and the cached data re-mirroring operation process; the determining a current main node according to identity information of the burst faulty node includes:
  when the burst faulty node has the main node identity, determining a surviving node acting as a non-main node as the current main node;
  the determining a first operation process to be performed subsequently based on the current main node includes:
  performing the cached data discarding process on the faulty node to clear data cached when the burst faulty node performs the cached data re-mirroring operation process on the faulty node; and
  re-initiating, by the current main node, a cached data re-mirroring operation process to the faulty node.

According to some implementations of the present application, the identity information includes a surviving node identity of a non-main node; the determining a current main node according to identity information of the burst faulty node includes:
  when the burst faulty node has the surviving node identity of the non-main node, determining the main node in the transitional mirrored pair as the current main node;
  the determining a first operation process to be performed subsequently based on the current main node includes:
  identifying, by the current main node, a process progress of the cached data re-mirroring operation process before the burst faulty node appears; and
  continuing to perform the cached data re-mirroring operation process before the burst faulty node appears according to the process progress.

According to some implementations of the present application, the identity information includes a faulty node identity, and the first operation process includes a host input and output process; the determining a current main node according to identity information of the burst faulty node includes:
  when the burst faulty node has the faulty node identity, determining the main node in the transitional mirrored pair as the current main node;
  the determining a first operation process to be performed subsequently based on the current main node includes:
  performing the host input and output process whereby a host normally caches data to the multi-control storage system.

According to some implementations of the present application, the method further includes:
  after determining the current main node, updating preferred peer nodes of the remaining two nodes in the transitional mirrored pair, and setting an alternative peer node to an invalid value.

According to some implementations of the present application, the method further includes:
  when there is a burst faulty node during performing the cached data discarding process on the redundant node, determining a second operation process to be performed subsequently according to a node type of the burst faulty node.

According to some implementations of the present application, the node type includes the redundant node; the determining a second operation process to be performed subsequently according to a node type of the burst faulty node includes:
  when the burst faulty node is the redundant node, not performing, by the node in the transitional mirrored pair, any operation process.

According to some implementations of the present application, the node type includes a non-redundant node in the transitional mirrored pair; the determining a second operation process to be performed subsequently according to a node type of the burst faulty node includes:
  when the burst faulty node is one of non-redundant nodes in the transitional mirrored pair, recombining the redundant node and the other non-redundant node in the transitional mirrored pair into a current mirrored pair;
  performing the cached data discarding process on the redundant node to continue the cached data discarding process performed before the burst faulty node appears; and
  when the redundant node completes the cached data discarding process, initiating, by the other non-redundant node in the transitional mirrored pair, a cached data re-mirroring operation process to the redundant node to realize the backup of the cached data.

According to some implementations of the present application, the non-redundant node in the current mirrored pair is the main node, and the redundant node is a slave node.

According to some implementations of the present application, the multi-control storage system is a four-control storage system.

In a second aspect, a data caching apparatus is provided, and the apparatus is provided in a multi-control storage system, where the multi-control storage system includes multiple controllers, and each controller is a node; the apparatus includes:
  an adding module, configured to, in response to a faulty node returning to normal, add the faulty node to a recombined mirrored pair according to a mirrored pair where the faulty node is initially located to obtain a transitional mirrored pair whereby in a cached data re-mirroring process, when one node of the mirrored pair is faulty, data mirroring continues between other nodes;
  an initiation module, configured to initiate, by a main node in the transitional mirrored pair, a cached data re-mirroring operation process to the faulty node; and
  a deletion module, configured to, in response to the main node in the transitional mirrored pair completing the cached data re-mirroring to the faulty node, delete a redundant node in the transitional mirrored pair based on an initial mirrored pair to switch the transitional mirrored pair back to the initial mirrored pair for data caching,
  where the recombined mirrored pair is a mirrored pair obtained based on two-by-two recombination of surviving nodes after the faulty node exits due to recombining the mirrored pair where the faulty node is initially located;
  the initial mirrored pair is a mirrored pair obtained based on two-by-two recombination of all nodes before the faulty node exits.

In a third aspect, a computer device is provided, including:
  at least one processor; and
  a memory communicatively connected to the at least one processor, where
  the memory stores computer instructions executable by the at least one processor, and the computer instructions are executed by the at least one processor to enable the at least one processor to perform the method according to the above-mentioned first aspect.

In a fourth aspect, a non-volatile computer-readable storage medium is provided, having stored thereon computer instructions for causing a computer to perform the method according to the above-mentioned first aspect.

According to the technical contents provided in the embodiments of the present application, in response to the faulty node returning to normal, the faulty node is added to the recombined mirrored pair to obtain the transitional mirrored pair. The recombined mirrored pair is a mirrored pair obtained based on two-by-two recombination of surviving nodes after the faulty node exits. The main node in the transitional mirrored pair initiates the cached data re-mirroring operation process to the faulty node. After the main node in the transitional mirrored pair completes the cached data re-mirroring to the faulty node, the redundant node in the transitional mirrored pair is deleted based on the initial mirrored pair to switch the transitional mirrored pair back to the initial mirrored pair for data caching. The initial mirrored pair is a mirrored pair obtained based on two-by-two recombination of all nodes before the faulty node exits. When the faulty node returns to normal, the number of nodes in the recombined mirrored pair is increased from two to three. When the initial mirrored pair is returned, the situation that a single node exists in the mirrored pair when the nodes are recombined is avoided. Even if a node exits due to a fault during the cached data re-mirroring process, data mirroring may also be performed on the other two nodes, thereby avoiding data confusion and loss and ensuring the security of the cached data.

DETAILED DESCRIPTION

The present application is further described in detail below in conjunction with the accompanying drawings and embodiments. It should be understood that the embodiments described herein are for the sole purpose of explaining the present application and are not intended to limit the present application.

Figure 1:
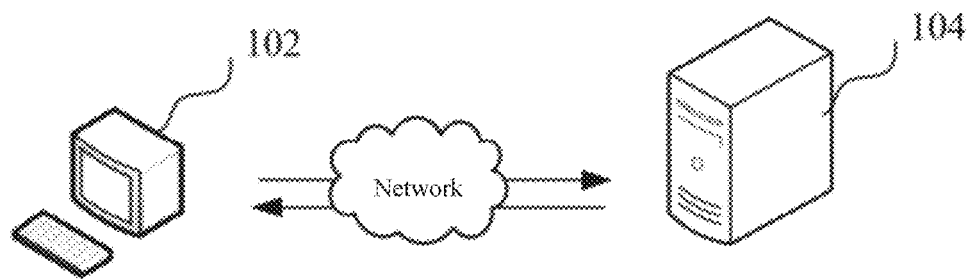
FIG. 1 is a diagram of an application environment of a data caching method in some embodiments.

For ease of understanding, a system to which the present application applies will first be described. The data caching method provided by the present application may be applied to a system architecture as shown in FIG. 1. A terminal 102 is communicated with a server 104 through a network. In response to a faulty node returning to normal, a storage system in the terminal 102 receives a teaming method sent by the server 104 and adds the faulty node to a recombined mirrored pair according to the teaming method to obtain a transitional mirrored pair. The recombined mirrored pair is a mirrored pair obtained based on two-by-two recombination of surviving nodes after the faulty node exits. A main node in the transitional mirrored pair initiates a cached data re-mirroring operation process to the faulty node. After the main node in the transitional mirrored pair completes the cached data re-mirroring to the faulty node, a redundant node in the transitional mirrored pair is deleted based on an initial mirrored pair to switch back to a mirrored pair before the fault of the multi-control storage system for data caching. The initial mirrored pair is a mirrored pair obtained based on two-by-two recombination of all nodes before the faulty node exits. The terminal 102 may be, but is not limited to, various personal computers, notebook computers, smart phones, tablet computers, and portable wearable devices, and the server 104 may be implemented as an independent server or a server cluster composed of multiple servers.

Figure 2:
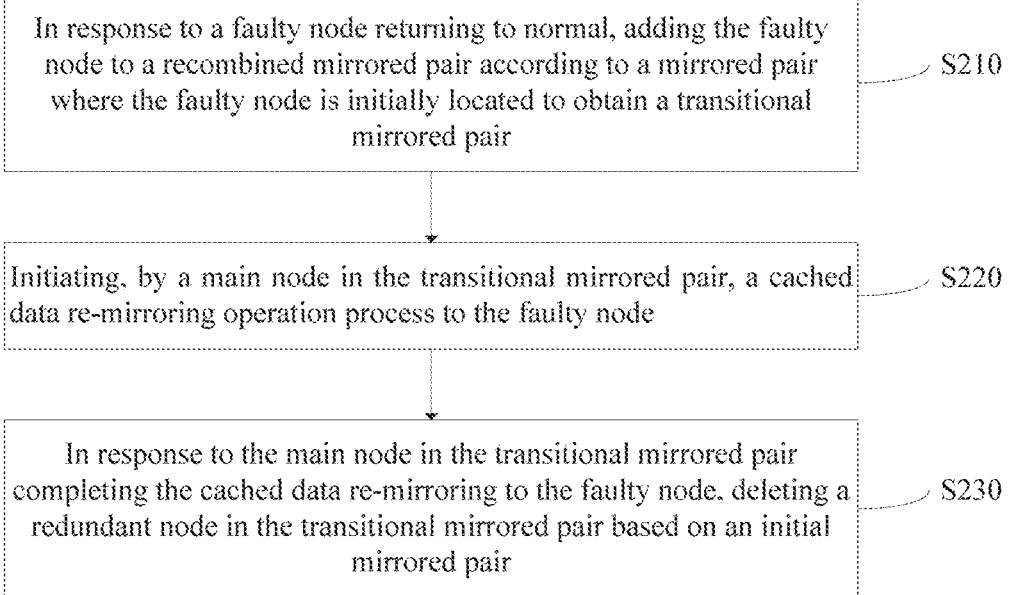
FIG. 2 is a schematic flowchart of a data caching method in some embodiments.

FIG. 2 is a flowchart of a data caching method provided by some embodiments of the present application. The method may be performed by the terminal 102 in the system shown in FIG. 1. As shown in FIG. 2, the method is applied to a multi-control storage system and may include the following steps.

At S210, in response to a faulty node returning to normal, the faulty node is added to a recombined mirrored pair according to a mirrored pair where the faulty node is initially located to obtain a transitional mirrored pair.

The faulty node is a node exited due to a fault, and the recombined mirrored pair is a mirrored pair obtained based on two-by-two recombination of surviving nodes after the faulty node exits. The multi-control storage system refers to a system that includes multiple controllers, for example, may include three, four, and five controllers. Each controller is a node.

Taking the multi-control storage system being a four-control storage system as an example, the storage system includes four controllers, i.e., a node 0, a node 1, a node 2, and a node 3, which may form initial mirrored pairs, including four mirrored pairs, i.e., (0, 1), (1, 2), (2, 3), and (3, 0). When a node exits due to a fault, a mirrored pair containing the faulty node needs to be recombined. For example, when the node 0 exits due to a fault, according to a circular mirroring principle, original two sets of mirrored pairs (0, 1) and (3, 0) need to be recombined, and the recombined mirrored pairs become (1, 2), (1, 2), (2, 3), and (3, 1). In this example, (1, 2), (1, 2), (2, 3), and (3, 1) are recombined mirrored pairs and the node 1, node 2, and node 3 are surviving nodes.

When node 0 returns to normal and rejoins, final four recombined mirrored pairs need to be returned to (0, 1), (1, 2), (2, 3), and (3, 0). Since a cached data re-mirroring operation process is required when a node returns, if the recombined mirrored pair is directly switched back to the initial mirrored pair, for example, for the first mirrored pair, (1, 2) is switched back to (0, 1), a corresponding process is to discard data of this mirrored pair on the node 2, and the data is mirrored from the node 1 to the node 0. In this case, since the cached data re-mirroring operation process takes a certain time, if the node 1 exits due to a fault during this period, data of the mirrored pair will be temporarily lost, resulting in service suspension.

The faulty node is added to the recombined mirrored pair according to the mirrored pair where the faulty node is initially located to obtain the transitional mirrored pair. The transitional mirrored pair includes mirrored pairs including three nodes, which may be denoted as (1, 2, 0) and (3, 1, 0). The existence of the transitional mirrored pair may ensure that even if a node exits due to a fault in the cached data re-mirroring operation process, the data may be normally backed up, thereby improving the security of the data.

At S220, a main node in the transitional mirrored pair initiates a cached data re-mirroring operation process to the faulty node.

The main node in the transitional mirrored pair is consistent with a main node in the recombined mirrored pair. For example, (1, 2) in the recombined mirrored pair has the main node of the node 1, and (1, 2, 0) in the transitional mirrored pair also has the node 1 as the main node. The main node may initiate the cached data re-mirroring operation process, while a newly joining faulty node may receive the process passively.

The main node in the transitional mirrored pair initiates the cached data re-mirroring operation process to the faulty node to realize data backup and avoid the situation of data loss when switching to the initial mirrored pair.

At S230, in response to the main node in the transitional mirrored pair completing the cached data re-mirroring to the faulty node, a redundant node in the transitional mirrored pair is deleted based on the initial mirrored pair.

The initial mirrored pair is a mirrored pair obtained based on two-by-two recombination of all nodes before the faulty node exits. For example, a four-control memory may form (0, 1), (1, 2), (2, 3), and (3, 0).

The redundant node is an additional node in the transitional mirrored pair that includes three nodes, compared to the corresponding mirrored pair in the initial mirrored pair. The transitional mirrored pair is compared with the initial mirrored pair to determine the redundant node, and the redundant node in the transitional mirrored pair is deleted to switch back to the mirrored pair before the fault of the multi-control storage system for data caching, i.e., switching the transitional mirrored pair back to the initial mirrored pair whereby a host input and output system normally caches data to the multi-control storage system.

It may be seen that in the embodiments of the present application, in response to the faulty node returning to normal, the faulty node is added to the recombined mirrored pair to obtain the transitional mirrored pair. The number of nodes in the recombined mirrored pair is increased from two to three, thereby avoiding the situation that a single node exists in the mirrored pair when the nodes are recombined. The main node in the transitional mirrored pair initiates a cached data re-mirroring operation process to the faulty node. After the main node in the transitional mirrored pair completes the cached data re-mirroring to the faulty node, the redundant node in the transitional mirrored pair is deleted based on the initial mirrored pair to switch back to the mirrored pair before the fault of the multi-control storage system for data caching. In this way, when the initial mirrored pair is returned, even if a node exits due to a fault during the cached data re-mirroring process, data mirroring may also be performed on the other two nodes, thereby avoiding data confusion and loss and ensuring the security of the cached data.

The steps in the above method flow are described in detail below. Firstly, the above-mentioned S210, i.e., "in response to a faulty node returning to normal, the faulty node is added to a recombined mirrored pair to obtain a transitional mirrored pair", is described in detail with reference to the embodiments.

As some implementations, S210 may include: determining a target mirrored pair for recombination when the faulty node exits according to the recombined mirrored pair; and adding the faulty node to the target mirrored pair in the recombined mirrored pair to obtain the transitional mirrored pair.

The target mirrored pair is a mirrored pair rejoined after the faulty node restores. When the faulty node exits, the nodes in the mirrored pair where the faulty node is originally located need to be recombined. A mirrored pair obtained by recombination in the recombined mirrored pair is determined to be the target mirrored pair, and the faulty node is added to the target mirrored pair.

A main node of the target mirrored pair in the recombined mirrored pair is used as a new main node to add the faulty node to obtain the transitional mirrored pair.

A main node identity of the target mirrored pair in the recombined mirrored pair is kept unchanged, and the faulty node is added to the target mirrored pair as a newly joining node to obtain the transitional mirrored pair.

The transitional mirrored pair includes two surviving nodes and one faulty node, and each node in the transitional mirrored pair is provided with two peer nodes. The surviving nodes are the nodes remaining in the multi-control storage system after the faulty node exits. A relationship established between one node and another node is called a peer, and the mentioned another node is a peer node.

There are three nodes in the transitional mirrored pair, and each node establishes a peer relationship with the other two nodes. Therefore, each node is provided with two peer nodes, which may be denoted as partnerNode0 and partnerNode1. However, different types of nodes have different importances as peer nodes, where partnerNode0 may represent a preferred peer node, and partnerNode1 may represent an alternative peer node. The preferred peer node is more important than the alternative peer node.

A newly joining node does not have the ability to receive cached data of the host input and output system. The importance of the newly joining node acting as the peer node is lower than the importance of a surviving node, and the surviving node acting as the main node may initiate a cached data re-mirroring operation process to the newly joining node. Therefore, the importance of the surviving node acting as the main node acting as the peer node is higher than that of an ordinary surviving node.

In the peer nodes of one surviving node, the other surviving node is a preferred peer node, and the faulty node is an alternative peer node. In the peer nodes of the faulty node, one surviving node acting as the main node is a preferred peer node, and the other surviving node is an alternative peer node.

As some implementations, when the transitional mirrored pair switches back to a mirrored pair before the fault of the multi-control storage system, the alternative peer node of each node in the mirrored pair is set to an invalid value.

The transitional mirrored pair includes three nodes, and the mirrored pair before the fault of the multi-control storage system includes two nodes. When a mirrored pair contains two nodes, the two nodes are peer nodes to each other. That is, each node has one peer node. In this case, the alternative peer node is not required and is set to an invalid value. A bit value of the alternative peer node may be set to 0 or 1 according to actual situations.

The above-mentioned S230, i.e., "after the main node in the transitional mirrored pair completes the cached data re-mirroring to the faulty node, a redundant node in the transitional mirrored pair is deleted based on the initial mirrored pair", is described in detail with reference to the embodiments.

As some implementations, S230 may include: determining the redundant node in the transitional mirrored pair according to a corresponding mirrored pair of the transitional mirrored pair in the initial mirrored pair; and deleting the redundant node in the transitional mirrored pair.

The corresponding mirrored pair of the transitional mirrored pair in the initial mirrored pair is a mirrored pair in the initial mirrored pair before the faulty node is added to the recombined mirrored pair to form the transitional mirrored pair. For example, the transitional mirrored pair is (1, 2, 0), and the recombined mirrored pair before the faulty node is added is (1, 2). (1, 2) is obtained by recombining (0, 1) in the initial mirrored pair, and then (0, 1) is the corresponding mirrored pair of the transitional mirrored pair in the initial mirrored pair.

A node that does not exist in the corresponding mirrored pair of the transitional mirrored pair in the initial mirrored pair is found from the transitional mirrored pair. The node is determined as a redundant node and then deleted. For example, for the transitional mirrored pair (1, 2, 0), the corresponding mirrored pair of the transitional mirrored pair in the initial mirrored pair is (0, 1). Then, the node 2 is the redundant node. Thus, the node 2 in the transitional mirrored pair (1, 2, 0) is deleted to obtain (1, 0).

A main node of the mirrored pair after deleting the redundant node needs to be consistent with a main node of the corresponding mirrored pair of the transitional mirrored pair in the initial mirrored pair, and each node is restored to have a single peer node. The alternative peer node is set to an invalid value.

As some implementations, the method further includes: after deleting the redundant node in the transitional mirrored pair, performing a cached data discarding process on the redundant node to delete corresponding cached data of the redundant node in the transitional mirrored pair.

The cached data discarding process is a process of deleting cached data of a node. After the main node in the transitional mirrored pair completes the cached data re-mirroring operation process to the faulty node, the corresponding cached data of the redundant node has already been mirrored. After the redundant node is deleted, the mirrored pair after deleting the redundant node does not need to save the corresponding cached data of the redundant node, and the cached data discarding process is performed on the redundant node. Deleting the corresponding cached data of the redundant node in the transitional mirrored pair may increase the cache space and improve the operating performance of the system.

As some implementations, the method further includes: when there is a burst faulty node during the main node in the transitional mirrored pair performing the cached data re-mirroring operation process to the faulty node, determining a current main node according to identity information of the burst faulty node; and determining a first operation process to be performed subsequently based on the current main node.

The burst faulty node is a node which suddenly fails during the main node in the transitional mirrored pair performing the cached data re-mirroring operation process to the faulty node. The first operation process includes a cached data discarding process, a cached data re-mirroring operation process, and a host input and output process. The current main node is the main node in the transitional mirrored pair after a sudden faulty.

Since the cached data re-mirroring operation process takes a certain time, and three nodes in the transitional mirrored pair are in a special state in this process, the newly joining faulty node may not replace the original surviving node. Therefore, when a node fault event occurs again in this process, different processing processes need to be formulated according to situations.

The burst faulty node may be a surviving node or a faulty node, and if it is a surviving node, it is necessary to further determine whether the burst faulty node is a main node. Therefore, the identity information of the burst faulty node may include a main node identity, a surviving node identity of a non-main node, and a faulty node identity. The current main node is determined based on the identity information of the burst faulty node to determine at least one first operation process to be performed subsequently.

As some implementations, when the burst faulty node has the main node identity, a surviving node acting as a non-main node is determined as the current main node. The cached data discarding process is performed on the faulty node to clear data cached when the burst faulty node performs the cached data re-mirroring operation process on the faulty node. The current main node re-initiates a cached data re-mirroring operation process to the faulty node.

It should be noted that whenever a node in the transitional mirrored pair exits, the cached data re-mirroring operation process re-initiated by the main node to the faulty node is interrupted.

If the burst faulty node has the main node identity, the remaining two nodes in the transitional mirrored pair are recombined into a new mirrored pair, and the surviving node acting as the non-main node is determined as the current main node.

The sudden fault of the original main node results in the main node not re-mirroring cached data to the faulty node, and the current main node needs to re-initiate the cached data re-mirroring operation process to the faulty node. In order to avoid duplication and confusion of the cached data of the faulty node, the cached data discarding process is performed on the faulty node before the current main node re-initiates the cached data re-mirroring operation process on the faulty node to clear data cached when the burst faulty node performs the cached data re-mirroring operation process on the faulty node.

As some implementations, when the burst faulty node has the surviving node identity of the non-main node, the main node in the transitional mirrored pair is determined as the current main node. The current main node identifies a process progress of the cached data re-mirroring operation process before the burst faulty node appears. The cached data re-mirroring operation process before the burst faulty node appears is continued to perform according to the process progress.

When the burst faulty node has the surviving node identity of the non-main node, the remaining two nodes in the transitional mirrored pair are recombined into a new mirrored pair, and the original main node in the transitional mirrored pair is still the current main node. Since the initiating node and the receiving node of the cached data re-mirroring operation process have not changed, the current main node needs to identify the process progress of the cached data re-mirroring operation process before the burst faulty node appears, find a point where the process is suspended, and continue to complete the process.

As some implementations, when the burst faulty node has the faulty node identity, the main node in the transitional mirrored pair is determined as the current main node. The host input and output process is performed whereby a host normally caches data to the multi-control storage system.

When the burst faulty node has the faulty node identity, the main node in the transitional mirrored pair does not need to perform cached data re-mirroring to the faulty node, and there is no node receiving the cached data in the transitional mirrored pair. The remaining two nodes in the transitional mirrored pair are recombined into a new mirrored pair, and the original main node in the transitional mirrored pair is still the current main node. The host input and output process is performed to restore the normal business process whereby the host may cache data to the multi-control storage system.

As some implementations, the method further includes: after determining the current main node, updating preferred peer nodes of remaining two nodes in the transitional mirrored pair, and setting an alternative peer node to an invalid value.

If there is a node exits due to a fault in the transitional mirrored pair, the remaining two nodes in the transitional mirrored pair are peer nodes to each other and are preferred peer nodes of each other. The alternative peer node does not exist and is set to an invalid value.

As some implementations, the method further includes: when there is a burst faulty node during performing the cached data discarding process on the redundant node, determining a second operation process to be performed subsequently according to a node type of the burst faulty node. The node type includes a redundant node and a non-redundant node in the transitional mirrored pair, and the second operation process may be not performing any operation process and may also be initiating a cached data discarding process or a cached data re-mirroring operation process.

When there is an interruption during performing the cached data discarding process on the redundant node, the influences on the redundant node and the non-redundant node in the transitional mirrored pair are different, and a subsequent operation process needs to be determined according to the node type of the burst faulty node.

As some implementations, when the burst faulty node is the redundant node, the node in the transitional mirrored pair does not perform any operation process.

When the burst faulty node is the redundant node, even if the node in the transitional mirrored pair initiates the cached data discarding process again, the redundant node may not perform. In addition, the redundant node is not already in the transitional mirrored pair and will not affect the normal operation of the multi-control storage system. Therefore, the node in the transitional mirrored pair does not perform any operation process, and it is considered that the discarding of the cached data of the redundant node is compulsorily completed.

As some implementations, when the burst faulty node is one of non-redundant nodes in the transitional mirrored pair, the redundant node and the other non-redundant node in the transitional mirrored pair are recombined into a current mirrored pair.

The cached data discarding process is performed on the redundant node to continue the cached data discarding process performed before the burst faulty node appears.

When the redundant node completes the cached data discarding process, the other non-redundant node in the transitional mirrored pair initiates a cached data re-mirroring operation process to the redundant node to realize the backup of the cached data.

When the burst faulty node is one of the non-redundant nodes in the transitional mirrored pair, it is indicated that one node remains in the initial mirrored pair switched back by the transitional mirrored pair, and the backup of cached data may not be performed, and a new node needs to be newly joined to form a new mirrored pair, i.e., the current mirrored pair.

After the main node in the transitional mirrored pair completes the cached data re-mirroring to the faulty node, the cached data corresponding to the faulty node and the main node are the same, and the faulty node also has the ability of the main node to initiate any process. Therefore, when either of the two non-redundant nodes in the transitional mirrored pair fails, the other non-redundant node may act as the main node of the current mirrored pair, and the redundant node is a slave node.

The cached data discarding process is performed on the redundant node to continue the cached data discarding process performed before the burst faulty node appears and clear the cached data mirrored before the redundant node. When the redundant node completes the cached data discarding process, the other non-redundant node in the transitional mirrored pair initiates the cached data re-mirroring operation process to the redundant node to realize the backup of the cached data and ensure the normal operation of the current mirrored pair.

According to the data caching method provided by the present application, the single-node restoration of the multi-control storage system may be realized, and a corresponding processing process may also be set in the scenario of overlaying node fault events in the restoration process, such as the cached data re-mirroring operation process and the cached data discarding process, thereby safely, timely, and effectively realizing the processing of a complex scenario in the restoration process of the multi-control storage node, avoiding the hidden danger of data security to the multi-control storage system caused by the overlaying of multiple events, and further improving the security of the cached data of the multi-control storage system.

It should be understood that, although the various steps in the flowcharts of FIG. 2 are shown sequentially as indicated by the arrows, these steps are not necessarily performed sequentially in the order indicated by the arrows. These steps are performed in no strict order unless explicitly stated in the present application, and these steps may be performed in other orders. Moreover, at least some of the steps in FIG. 2 may include multiple sub-steps or stages that are not necessarily performed at the same time, but may be performed at different times, and the order in which these sub-steps or stages are performed is not necessarily sequential, but may be performed in turn with other steps or at least some of the sub-steps or stages of other steps.

Figure 3:
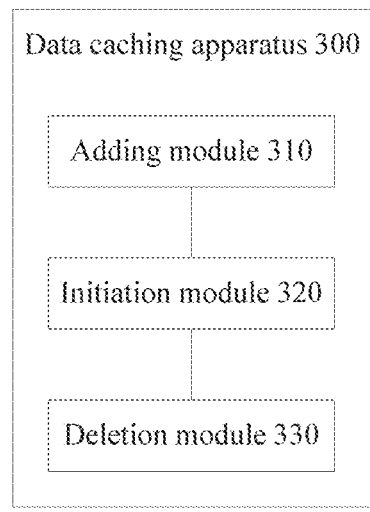
FIG. 3 is a block diagram of a structure of a data caching apparatus in some embodiments.

FIG. 3 is a schematic structural diagram of a data caching apparatus provided by some embodiments of the present application. The apparatus may be provided in the terminal 102 in the system shown in FIG. 1 to perform the method flow shown in FIG. 2. As shown in FIG. 3, the apparatus may include: an adding module 310, an initiation module 320, and a deletion module 330 and may further include: an execution module, a determination module, and an updating module. The main functions of the component modules are as follows.

The adding module 310 is configured to, in response to a faulty node returning to normal, add the faulty node to a recombined mirrored pair according to a mirrored pair where the faulty node is initially located to obtain a transitional mirrored pair.

The initiation module 320 is configured to initiate, by a main node in the transitional mirrored pair, a cached data re-mirroring operation process to the faulty node.

The deletion module 330 is configured to, in response to the main node in the transitional mirrored pair completing the cached data re-mirroring to the faulty node, delete a redundant node in the transitional mirrored pair based on an initial mirrored pair to switch the transitional mirrored pair back to the initial mirrored pair for data caching.

The recombined mirrored pair is a mirrored pair obtained based on two-by-two recombination of surviving nodes after the faulty node exits.

the initial mirrored pair is a mirrored pair obtained based on two-by-two recombination of all nodes before the faulty node exits.

As some implementations, the adding module 310 is specifically configured to: determine a target mirrored pair for recombination when the faulty node exits according to the recombined mirrored pair; and add the faulty node to the target mirrored pair in the recombined mirrored pair to obtain the transitional mirrored pair.

As some implementations, the adding module 310 is specifically configured to: add the faulty node by a main node of the target mirrored pair in the recombined mirrored pair used as a new main node to obtain the transitional mirrored pair.

As some implementations, the transitional mirrored pair includes two surviving nodes and one faulty node, and each node in the transitional mirrored pair is provided with two peer nodes.

Between the peer nodes of one surviving node, the other surviving node is a preferred peer node, and the faulty node is an alternative peer node.

Between the peer nodes of the faulty node, one surviving node acting as the main node is a preferred peer node, and the other surviving node is an alternative peer node.

As some implementations, when the transitional mirrored pair switches back to a mirrored pair before the fault of the multi-control storage system, the alternative peer node of each node in the mirrored pair is set to an invalid value.

As some implementations, the deletion module 330 is specifically configured to: determine the redundant node in the transitional mirrored pair according to a corresponding mirrored pair of the transitional mirrored pair in the initial mirrored pair; and delete the redundant node in the transitional mirrored pair.

As some implementations, the apparatus further includes the execution module, configured to: after deleting the redundant node in the transitional mirrored pair, perform a cached data discarding process on the redundant node to delete corresponding cached data of the redundant node in the transitional mirrored pair.

As some implementations, the apparatus further includes the determination module, configured to: when there is a burst faulty node during the main node in the transitional mirrored pair performing the cached data re-mirroring operation process to the faulty node, determine a current main node according to identity information of the burst faulty node; and determine a first operation process to be performed subsequently based on the current main node.

As some implementations, the identity information includes a main node identity, and the first operation process includes a cached data discarding process and the cached data re-mirroring operation process. The determination module is specifically configured to: when the burst faulty node has the main node identity, determine a surviving node acting as a non-main node as the current main node;

perform the cached data discarding process on the faulty node to clear data cached when the burst faulty node performs the cached data re-mirroring operation process on the faulty node; and re-initiate, by the current main node, a cached data re-mirroring operation process to the faulty node.

As some implementations, the identity information includes a surviving node identity of a non-main node. The determination module is specifically configured to: when the burst faulty node has the surviving node identity of the non-main node, determine the main node in the transitional mirrored pair as the current main node;

identify, by the current main node, a process progress of the cached data re-mirroring operation process before the burst faulty node appears; and continue to perform the cached data re-mirroring operation process before the burst faulty node appears according to the process progress.

As some implementations, the identity information includes a faulty node identity, and the first operation process includes a host input and output process. The determination module is specifically configured to: when the burst faulty node has the faulty node identity, determine the main node in the transitional mirrored pair as the current main node; and perform the host input and output process whereby a host normally caches data to the multi-control storage system.

As some implementations, the apparatus further includes the updating module, configured to: after determining the current main node, update preferred peer nodes of the remaining two nodes in the transitional mirrored pair, and set an alternative peer node to an invalid value.

As some implementations, the determination module is further configured to: when there is a burst faulty node during performing the cached data discarding process on the redundant node, determine a second operation process to be performed subsequently according to a node type of the burst faulty node.

As some implementations, the node type includes the redundant node. The determination module is specifically configured to: when the burst faulty node is the redundant node, not perform, by the node in the transitional mirrored pair, any operation process.

As some implementations, the node type includes a non-redundant node in the transitional mirrored pair. The determination module is specifically configured to: when the burst faulty node is one of non-redundant nodes in the transitional mirrored pair, recombine the redundant node and the other non-redundant node in the transitional mirrored pair into a current mirrored pair;

perform the cached data discarding process on the redundant node to continue the cached data discarding process performed before the burst faulty node appears; and when the redundant node completes the cached data discarding process, initiate, by the other non-redundant node in the transitional mirrored pair, a cached data re-mirroring operation process to the redundant node to realize the backup of the cached data.

As some implementations, the non-redundant node in the current mirrored pair is the main node, and the redundant node is a slave node.

As some implementations, the multi-control storage system is a four-control storage system.

The identical and similar parts between the above embodiments may refer to each other, and each embodiment focuses on the differences from other embodiments. In particular, with respect to the apparatus embodiment, which is substantially similar to the method embodiment, the description is relatively simple with reference to the description of the method embodiment.

It should be noted that the embodiments of the present application may involve the use of user data, and in practical application, user personal data may be used in the schemes described herein to the extent permitted by applicable laws and regulations in compliance with the requirements of applicable laws and regulations of the country in which used (e.g., explicit consent by the user, tangible notification to the user, explicit authorization by the user, etc.).

Figure 4:
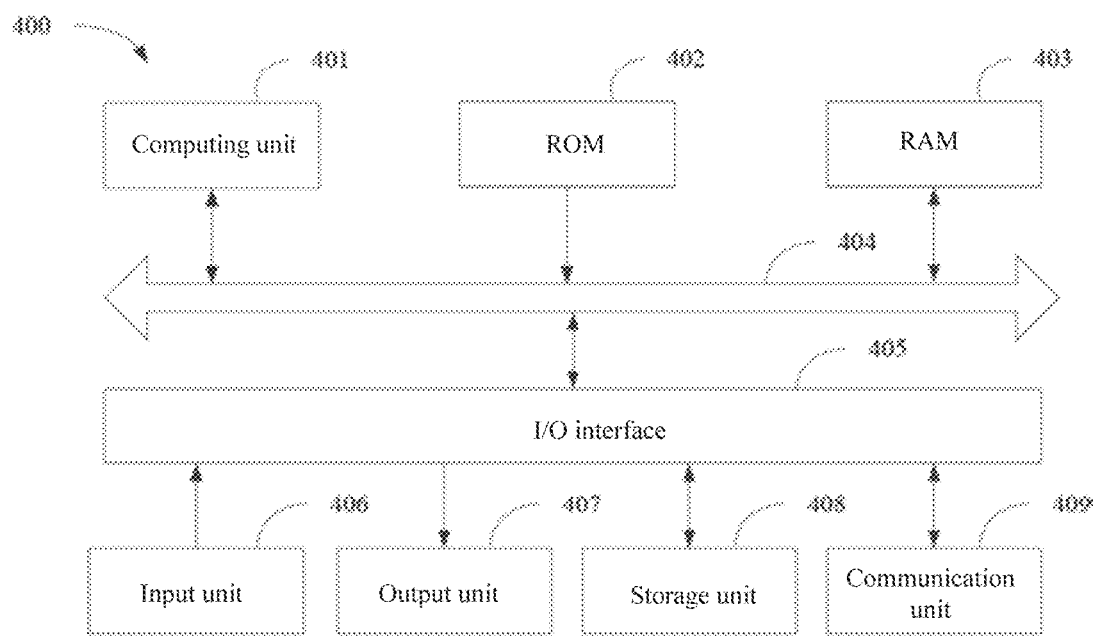
FIG. 4 is a schematic structural diagram of a computer device in some embodiments.
Figure 5:
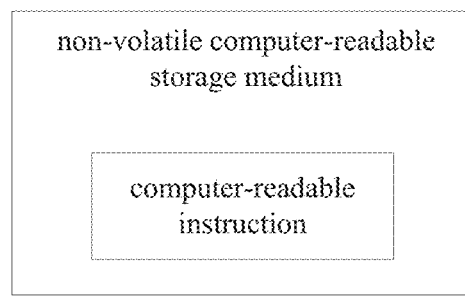
FIG. 5 is a schematic structural diagram of a non-volatile computer-readable storage medium in some embodiments.

According to the embodiments of the present application, as shown in FIG. 4 and FIG. 5, the present application also provides a computer device and a non-volatile computer-readable storage medium.

FIG. 4 is a block diagram of a computer device according to some embodiments of the present application. The computer device is intended to represent various forms of digital computers or mobile apparatuses. The digital computers may include desktop computers, portable computers, workstations, personal digital assistants, servers, mainframe computers, and other suitable computers. The mobile apparatuses may include tablets, smart phones, and wearable devices.

As shown in FIG. 4, a device 400 includes a computing unit 401, a read only memory (ROM) 402, a random access memory (RAM) 403, a bus 404, and an input/output (I/O) interface 405. The computing unit 401, the ROM 402, and the RAM 403 are connected to each other through the bus 404. The I/O interface 405 is also connected to the bus 404.

The computing unit 401 may perform various processes in the method embodiments of the present application according to computer instructions stored in the ROM 402 or computer instructions loaded from a storage unit 408 into the RAM 403. The computing unit 401 may be various general and/or dedicated processing components with processing and computing capabilities. The computing unit 401 may include, but is not limited to, a central processing unit (CPU), a graphics processing unit (GPU), various dedicated artificial intelligence (AI) computing chips, various computing units running machine learning model algorithms, a digital signal processor (DSP), and any suitable processor, a controller, and a microcontroller. In some embodiments, the method provided by the embodiments of the present application may be implemented as a computer software program tangibly contained in the non-volatile computer-readable storage medium, such as the storage unit 408.

The RAM 403 may also store various programs and data required for the operation of the device 400. Some or all of the computer programs may be loaded and/or installed on the device 400 via the ROM 802 and/or a communication unit 409.

An input unit 406, an output unit 407, the storage unit 408, and the communication unit 409 in the device 400 may be connected to the I/O interface 405. The input unit 406 may be, for example, a keyboard, a mouse, a touch screen, and a microphone. The output unit 407 may be, for example, a display, a speaker, and an indicator light. The device 400 may exchange information, data, etc., with other devices through the communication unit 409.

It should be noted that the device may also include other components necessary for proper operation. The device may also include the components necessary to implement the solution of the present application and not necessarily include the components shown in the drawings.

Various implementations of the systems and techniques described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or combinations thereof.

The computer instructions for implementing the methods of the present application may be written in any combination of one or more programming languages. These computer instructions may be provided to the computing unit 401 whereby the computer instructions, when executed by the computing unit 401, such as the processor, cause the steps involved in method embodiments of the present application to be performed.

The non-volatile computer-readable storage medium provided by the present application may be a tangible medium that may contain or store computer instructions for performing the steps involved in method embodiments of the present application. The non-volatile computer-readable storage medium may include, but is not limited to, electronic, magnetic, optical, electromagnetic, and other forms of storage media.

The above-mentioned implementations do not constitute a limitation on the scope of the present application. It should be appreciated by a person skilled in the art that various modifications, combinations, sub-combinations, and substitutions may be made according to design requirements and other factors. Any modifications, equivalents, improvements, etc. made within the spirit and principles of the present application should be included within the scope of the present application.

The invention claimed is:

1. A data caching method, wherein the method is applied to a multi-control storage system, the multi-control storage system comprises multiple controllers, each of the multiple controllers is a node, and the method comprises:
    in response to a faulty node returning to normal, adding the faulty node to a recombined mirrored pair according to a mirrored pair where the faulty node is initially located to obtain a transitional mirrored pair whereby in a cached data re-mirroring process, when one node of the transitional mirrored pair is faulty, data mirroring continues between other nodes;
    initiating, by a main node in the transitional mirrored pair, a cached data re-mirroring operation process to the faulty node; and
    in response to the main node in the transitional mirrored pair completing the cached data re-mirroring operation process to the faulty node, deleting a redundant node in the transitional mirrored pair based on an initial mirrored pair to switch the transitional mirrored pair back to the initial mirrored pair for data caching,
    wherein the recombined mirrored pair is a mirrored pair obtained based on two-by-two recombination of surviving nodes after the faulty node exits due to recombining the mirrored pair where the faulty node is initially located; and
    the initial mirrored pair is a mirrored pair obtained based on two-by-two recombination of all nodes before the faulty node exits.

2. The method according to claim 1, wherein the in response to a faulty node returning to normal, adding the faulty node to a recombined mirrored pair according to a mirrored pair where the faulty node is initially located to obtain a transitional mirrored pair comprises:
    determining a target mirrored pair for recombination when the faulty node exits according to the mirrored pair where the faulty node is initially located; and
    adding the faulty node to the target mirrored pair in the recombined mirrored pair to obtain the transitional mirrored pair.

3. The method according to claim 2, wherein the adding the faulty node to the target mirrored pair in the recombined mirrored pair to obtain the transitional mirrored pair comprises:

adding the faulty node by a main node of the target mirrored pair in the recombined mirrored pair used as a new main node to obtain the transitional mirrored pair.

4. The method according to claim 1, wherein the transitional mirrored pair comprises two surviving nodes and one faulty node, and each node in the transitional mirrored pair is provided with two peer nodes;
  in first peer nodes of a first surviving node of the two surviving nodes, a second surviving node of the two surviving nodes is a preferred peer node, and the faulty node is an alternative peer node;
  in second peer nodes of the faulty node, a first surviving node of the two surviving nodes acting as the main node is the preferred peer node, and a second surviving node of the two surviving nodes is an alternative peer node.

5. The method according to claim 4, wherein in response to a determination that the transitional mirrored pair switches back to the mirrored pair before a fault of the multi-control storage system, the alternative peer node of each node in the transitional mirrored pair is set to an invalid value.

6. The method according to claim 1, wherein the deleting a redundant node in the transitional mirrored pair based on an initial mirrored pair comprises:
  determining the redundant node in the transitional mirrored pair according to a corresponding mirrored pair of the transitional mirrored pair in the initial mirrored pair; and
  deleting the redundant node in the transitional mirrored pair.

7. The method according to claim 1, further comprising:
  after deleting the redundant node in the transitional mirrored pair, performing a cached data discarding process on the redundant node to delete corresponding cached data of the redundant node in the transitional mirrored pair.

8. The method according to claim 1, further comprising:
  in response to a determination that there is a burst faulty node during the main node in the transitional mirrored pair performing the cached data re-mirroring operation process to the faulty node, determining a current main node according to identity information of the burst faulty node; and
  determining a first operation process to be performed subsequently based on the current main node.

9. The method according to claim 8, wherein the identity information comprises a main node identity, and the first operation process comprises a cached data discarding process and the cached data re-mirroring operation process; the determining a current main node according to identity information of the burst faulty node comprises:
  in response to a determination that the burst faulty node has the main node identity, determining a surviving node acting as a non-main node as the current main node;
  the determining a first operation process to be performed subsequently based on the current main node comprises:
    performing the cached data discarding process on the faulty node to clear data cached in response to a determination that the burst faulty node performs the cached data re-mirroring operation process on the faulty node; and
    re-initiating, by the current main node, the cached data re-mirroring operation process to the faulty node.

10. The method according to claim 8, wherein the identity information comprises a surviving node identity of a non-main node; the determining a current main node according to identity information of the burst faulty node comprises:
  in response to a determination that the burst faulty node has the surviving node identity of the non-main node, determining the main node in the transitional mirrored pair as the current main node;
  the determining a first operation process to be performed subsequently based on the current main node comprises:
    identifying, by the current main node, a process progress of the cached data re-mirroring operation process before the burst faulty node appeared; and
    continuing to perform the cached data re-mirroring operation process before the burst faulty node appeared according to the process progress.

11. The method according to claim 8, wherein the identity information comprises a faulty node identity, and the first operation process comprises a host input and output process; the determining a current main node according to identity information of the burst faulty node comprises:
  in response to a determination that the burst faulty node has the faulty node identity, determining the main node in the transitional mirrored pair as the current main node;
  the determining a first operation process to be performed subsequently based on the current main node comprises:
    performing the host input and output process whereby a host normally caches data to the multi-control storage system.

12. The method according to claim 8, further comprising:
  after determining the current main node, updating preferred peer nodes of remaining two nodes in the transitional mirrored pair, and setting an alternative peer node to an invalid value.

13. The method according to claim 7, further comprising:
  in response to a determination that there is a burst faulty node during performing the cached data discarding process on the redundant node, determining a second operation process to be performed subsequently according to a node type of the burst faulty node.

14. The method according to claim 13, wherein the node type comprises the redundant node; the determining a second operation process to be performed subsequently according to a node type of the burst faulty node comprises:
  in response to a determination that the burst faulty node is the redundant node, not performing, by the redundant node in the transitional mirrored pair, any operation process.

15. The method according to claim 13, wherein the node type comprises a non-redundant node in the transitional mirrored pair; the determining a second operation process to be performed subsequently according to a node type of the burst faulty node comprises:
  in response to a determination that the burst faulty node is a first non-redundant node of non-redundant nodes in the transitional mirrored pair, recombining the redundant node and a second non-redundant node of the non-redundant nodes in the transitional mirrored pair into a current mirrored pair;
  performing the cached data discarding process on the redundant node to continue the cached data discarding process performed before the burst faulty node appeared; and in response to a determination that the redundant node completes the cached data discarding process, initiating, by the second non-redundant node in the transitional mirrored pair, the cached data re-mirroring operation process to the redundant node to realize backup of the cached data.

16. The method according to claim 15, wherein the non-redundant node in the current mirrored pair is the main node, and the redundant node is a slave node.

17. The method according to claim 1, wherein the multi-control storage system is a four-control storage system.

18. The method according to claim 1, wherein the multiple controllers are at least three controllers.

19. A computer device, comprising:
at least one processor; and
a memory communicatively connected to the at least one processor, wherein
the memory stores computer instructions executable by the at least one processor, and the computer instructions are executed by the at least one processor to enable the at least one processor to perform a data caching method, wherein the method is applied to a multi-control storage system, the multi-control storage system comprises multiple controllers, each of the multiple controllers is a node, and the method comprises:
in response to a faulty node returning to normal, adding the faulty node to a recombined mirrored pair according to a mirrored pair where the faulty node is initially located to obtain a transitional mirrored pair whereby in a cached data re-mirroring process, when one node of the transitional mirrored pair is faulty, data mirroring continues between other nodes;
initiating, by a main node in the transitional mirrored pair, a cached data re-mirroring operation process to the faulty node; and
in response to the main node in the transitional mirrored pair completing the cached data re-mirroring operation process to the faulty node, deleting a redundant node in the transitional mirrored pair based on an initial mirrored pair to switch the transitional mirrored pair back to the initial mirrored pair for data caching,
wherein the recombined mirrored pair is a mirrored pair obtained based on two-by-two recombination of surviving nodes after the faulty node exits due to recombining the mirrored pair where the faulty node is initially located; and
the initial mirrored pair is a mirrored pair obtained based on two-by-two recombination of all nodes before the faulty node exits.

20. A non-transitory computer-readable storage medium, having stored thereon computer instructions for causing a computer to perform a data caching method, wherein the method is applied to a multi-control storage system, the multi-control storage system comprises multiple controllers, each of the multiple controllers is a node, and the method comprises:
in response to a faulty node returning to normal, adding the faulty node to a recombined mirrored pair according to a mirrored pair where the faulty node is initially located to obtain a transitional mirrored pair whereby in a cached data re-mirroring process, when one node of the transitional mirrored pair is faulty, data mirroring continues between other nodes;
initiating, by a main node in the transitional mirrored pair, a cached data re-mirroring operation process to the faulty node; and
in response to the main node in the transitional mirrored pair completing the cached data re-mirroring operation process to the faulty node, deleting a redundant node in the transitional mirrored pair based on an initial mirrored pair to switch the transitional mirrored pair back to the initial mirrored pair for data caching,
wherein the recombined mirrored pair is a mirrored pair obtained based on two-by-two recombination of surviving nodes after the faulty node exits due to recombining the mirrored pair where the faulty node is initially located; and
the initial mirrored pair is a mirrored pair obtained based on two-by-two recombination of all nodes before the faulty node exits.

* * * * *